United States Patent

Nesset et al.

Patent Number: 5,987,040
Date of Patent: Nov. 16, 1999

[54] OPTICAL AND GATE

[75] Inventors: Derek Nesset, Ipswich; David Cotter, Woodbridge; Martin C. Tatham, Ipswich, all of United Kingdom

[73] Assignee: British Telecommunications public limited company, London, United Kingdom

[21] Appl. No.: 08/605,201

[22] PCT Filed: Feb. 28, 1995

[86] PCT No.: PCT/GB95/00425

§ 371 Date: Aug. 29, 1996

§ 102(e) Date: Aug. 29, 1996

[87] PCT Pub. No.: WO95/23997

PCT Pub. Date: Sep. 8, 1995

[30] Foreign Application Priority Data

Mar. 1, 1994 [GB] United Kingdom ............... 8404788
Sep. 30, 1994 [EP] European Pat. Off. ............ 94307188

[51] Int. Cl.$^6$ ............................................. H01J 3/30
[52] U.S. Cl. ..................................................... 372/8
[58] Field of Search ........................................... 372/8

[56] References Cited

U.S. PATENT DOCUMENTS 3,849,740  11/1974  Brandt ............................. 372/8
4,873,690  10/1989  Adams ............................. 372/8

OTHER PUBLICATIONS

Andrekson et al, Electronics Letters, 27, 1991, p. 922. No month 1991.
Schnabel et al, "All Optical And Gate Using Femtosecond Nonlinear Gain Dynamics in Semiconductor Laser Amplifiers", ECOC 93.19The European Conference on Optical Communication Proceedings, vol. 2, Sep. 12, 1993, Montreux, CH, pp. 133–136.
Andrekson et al., "16gbit/s All Optical Demultiplexing Using Four–Wave Mixing", Electron. Lett., 27, 1991, p. 922 no month.
Heismann, F., et al., "Polarisation–Independent Photonic Switching System Using Fast Automatic Polarisation Controllers", IEEE Photonics Technology Letters, vol. 5, No. 11, 1993 no month.

Primary Examiner—Rodney Bovernick
Assistant Examiner—Robert E. Wise
Attorney, Agent, or Firm—Nixon & Vanderhye P.C.

[57] ABSTRACT

An optical AND gate includes at least one semiconductor laser amplifier (SLA) and inputs for first and second optical signals. The gate produces an output corresponding to the AND product of A and B. In one aspect of the invention, the first and second signals are equal in wavelength. The gate may comprise a single SLA which receives the first signal A together with a third signal P, which may be a continuous wave pump. The second signal B is input in an orthogonal polarization state to A and P. Alternatively, the gate may comprise a pair of SLAs. A first SLA receives the first signal A together with the pump P. A sideband is selected from the output of the first SLA and input to the second SLA together with the second signal B. A sideband is selected from the output of the second SLA corresponding to the AND product C of A and P with B.

22 Claims, 13 Drawing Sheets

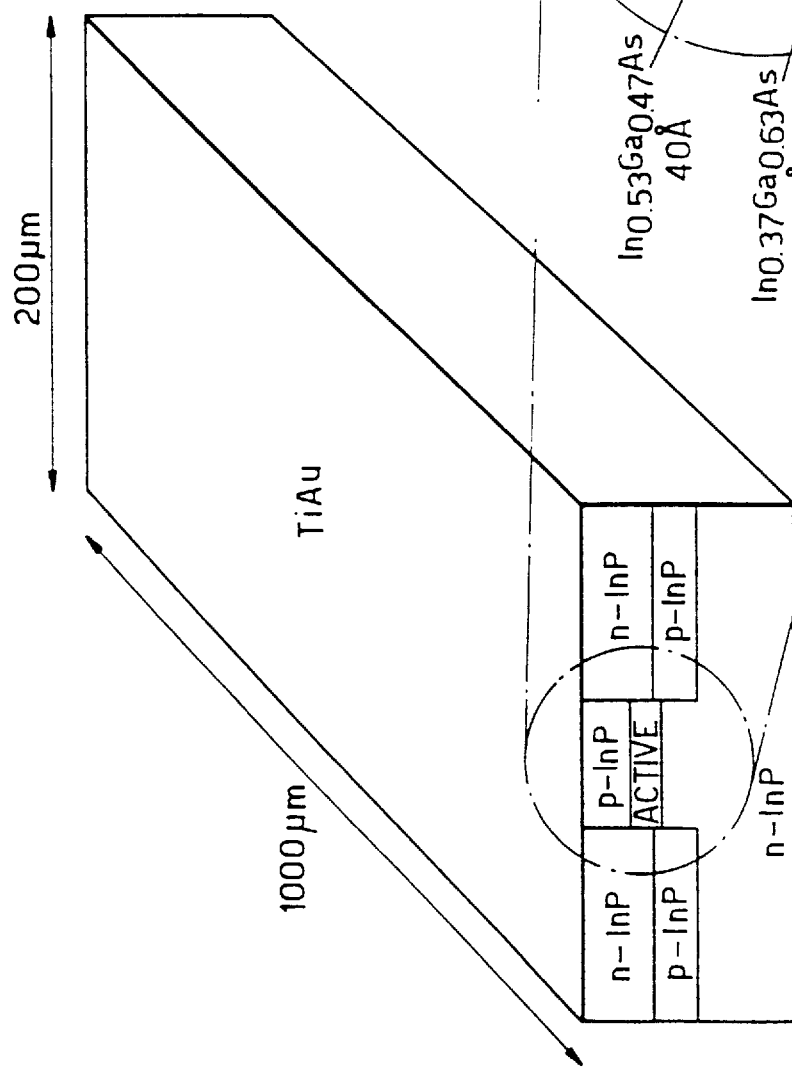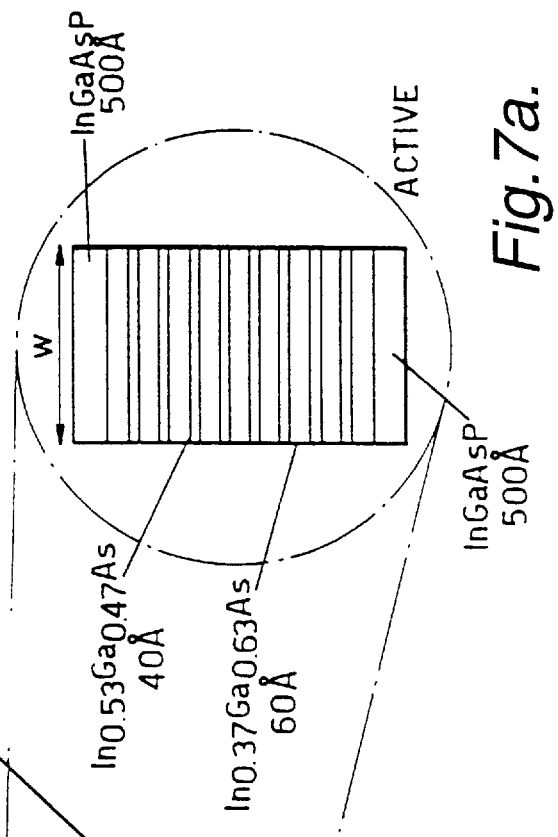
Fig. 7.
Fig. 7a.

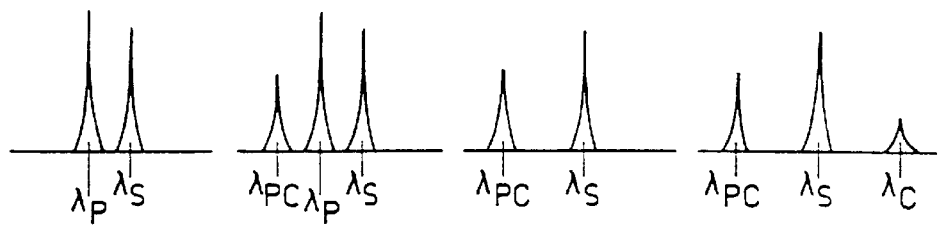
Fig. 12b.   Fig. 12d.
Fig. 12a.   Fig. 12c.
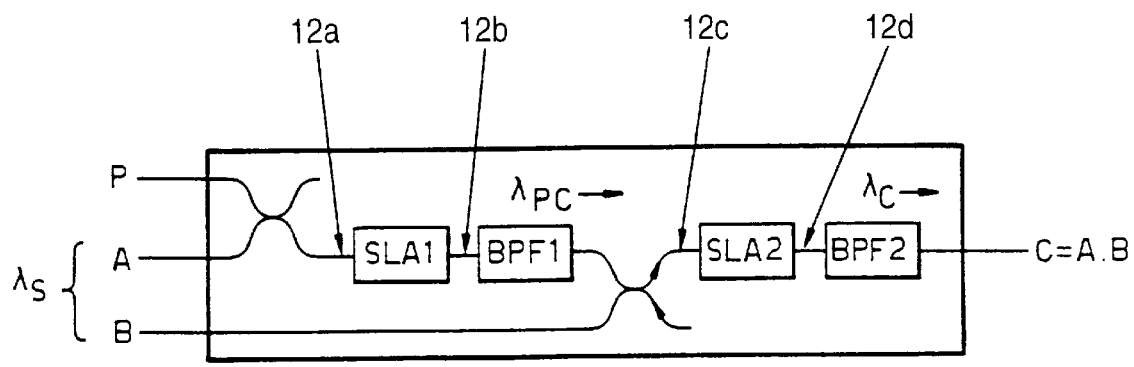
A AND B ARE TWO INDEPENDENT
SIGNALS AT THE SAME WAVELENGTH $\lambda_S$
Fig. 12.

OPTICAL AND GATE

BACKGROUND TO THE INVENTION

1. Field of the Invention

The present invention relates to an all-optical gate for carrying out an AND logic operation. Such a gate might be used, for example, in an optical telecommunications system, or in optical data-processing devices.

2. Related Art

AND is a fundamental logic operation necessary for example, for the implementation of optical networks including photonic switching nodes. Our co-pending international application no PCT/GB94/00397, the contents of which are incorporated herein by reference, describes and claims one example of the use of an AND function in recognising an address carried in the header of a frame on the optical network, and controlling a routing switch accordingly.

It has recently been proposed to use the process known as four-wave mixing (FWM) to implement an AND function. FWM produces an output proportional to the product of the electric fields of two input optical signals. Andrekson et al: "16 Gbit/s All Optical Demultiplexing Using Four-wave Mixing," Electron. Lett., 27, 1991, pp. 922 and R. Schnable, W. Pieper, R. Ludwig, H. G. Weber: "All Optical AND Gate using Femtosecond Non-linear Gain Dynamics in Semiconductor Laser Amplifiers", ECOC '93 describe implementations of AND functions using FWM in single-mode optical fibre and in semiconductor laser amplifiers (SLAs) respectively. Potentially such devices might be appropriate for switching or logic processing functions in optical telecommunications networks. However, the optical-fibre based devices require long interaction lengths, and so have a large in-built switch latency. This latency makes such devices unsuitable for applications where a fast decision time is required. SLAs by contrast have short device lengths, and hence low latency and are capable of high switching speeds due to their non-linear gain dynamics.

SUMMARY OF THE INVENTION

According to a first aspect of the present invention, there is provided an optical AND gate including at least one semiconductor laser amplifier (SLA) and inputs for first and second optical signals (A,B), the AND gate being arranged by a process of four wave mixing (FWM) to produce an output corresponding to the AND product of the first and second optical signals (A,B), characterised in that the first and second optical signals are substantially equal in wavelength.

Hitherto, optical AND gates using FWM have suffered the serious limitation that they can only function efficiently with signals which are at different frequencies within a certain narrowly defined range. For example, the above-cited paper by Andrekson et al requires a minimum separation between the signals to be ANDed of 0.8 nm and at this separation suffers problems of crosstalk which make it desirable in general to use an even greater wavelength spacing. The present invention overcomes this limitation to provide an AND gate which functions with wavelength-degenerate inputs. These may, for example, be derived from a common source and so have identical wavelengths, or may be produced by different sources operating at a common standard wavelength.

Preferably the optical AND gate is further characterised by an input for a third optical signal (P) arranged, by interaction with at least one of the first and second optical signals, to promote FWM within the at least one SLA.

In this preferred aspect of the present invention, a third optical signal, which may be a continuous wave signal, and is at a different wavelength to the two signals (A,B) is input to the AND gate and undergoes four-wave mixing. This may interact, for example, by beating with one of the two signals (A, B), and thereby causing modulation of the carrier distribution within the SLA, producing a dynamic grating. The other of the two signals (A, B) then scatters off this dynamic grating generating FWM sidebands.

Preferably the optical AND gate comprises a single SLA arranged to receive the first signal and the third optical signal, the first and third optical signals being co-polarised, and arranged to receive the second optical signal in an orthogonal polarisation state to the first and third optical signals, and means for selecting a sideband output from the SLA corresponding to the AND product (C) of the other optical signal with the one optical signal and the third optical signal.

This aspect of the present invention uses signals in orthogonal polarisation states to provide an AND gate based on a single SLA. The interaction of a pair of co-polarised is optical signals in the SLA produces a modulation of the SLA carrier densities distribution. This pair of co-polarised optical signals comprises a pump signal P which is a continuous wave signal, together with the first of the signals to be ANDed, A. The other signal B is then injected into the SLA in an orthogonal polarisation state. Because of this orthogonality, FWM does not take place between B and P alone or B and A alone. However, the modulation of the carrier distribution in the SLA produces effects which are non-polarisation sensitive, producing a dynamic grating, as already described. The other signal B scatters off the dynamic grating resulting in the production of FWM sidebands in the output from the SLA. With an appropriate filter, one of the sidebands can be selected to provide an output corresponding to the AND function between A and B.

Preferably the optical AND gate includes a polarising beam-splitter/combiner on the input side of the SLA for receiving the orthogonally polarised signal (B).

The above-described AND gate with an orthogonally polarised input is not limited to use with wavelength-degenerate inputs. Where such an AND gate is used in place of a conventional AND gate to process signals at different wavelengths, it offers the advantage that its efficiency is less dependent upon the magnitude of the wavelength-spacing between the inputs, by comparison with conventional devices.

According to a second aspect of the present invention there is provided an optical AND gate including a semiconductor laser amplifier (SLA) having inputs for first, second and third optical signals, the first and third optical signals (A, P) being co-polarised and interacting in the SLA by a process of four-wave mixing (FWM), and means for selecting an FWM sideband output from the SLA, characterised in that the input for the second optical signal is arranged to receive that signal orthogonally polarised with respect to the first and second optical signals, the first and third optical signals beating and thereby generating a dynamic grating, interaction of the second optical signal with the dynamic grating producing the FWM sideband corresponding to the AND product of the orthogonally polarised second optical signal with the first and second optical signals.

As an alternative to the use of a single SLA with an orthogonally polarised input, the optical AND gate may comprise a first SLA arranged to receive the first optical signal (A) together with the third signal (P) at a different wavelength to the first optical signal, means for selecting a sideband output from the first SLA, a second SLA arranged to receive the selected sideband output from the first SLA together with the second optical signal (B), and means for selecting a sideband in the output of the second SLA corresponding to the AND product (C) of the said first and second signals (A,B).

According to a third aspect of the present invention a method of ANDing two optical signals comprising applying first and second optical signals (A, B) to an optical AND gate comprising at least one semiconductor laser amplifier (SLA) and by a process of four-wave mixing producing an output from the at least one SLA corresponding to the AND product of the first and second optical signals is characterised in that the first and second optical signals are substantially equal in wavelength.

According to a fourth aspect of the present invention there is provided a method of ANDing optical signals comprising inputting first and second optical signals, and a third optical signal co-polarised with respect to the first optical signal, to an optical AND gate, applying the first and third optical signals to a semiconductor laser amplifier (SLA), generating four-wave mixing (FWM) in the SLA, and selecting a sideband in the output from the SLA corresponding to the AND product, characterised by applying the second optical signal to the SLA orthogonally polarised with respect to the first and third optical signals, the selected sideband corresponding to the AND product of the second orthogonally polarised optical signal with the first and second optical signals.

The present invention also encompasses a method and apparatus for demultiplexing using the optical gates of the first and second aspects.

BRIEF DESCRIPTION OF THE DRAWINGS

Systems embodying the present invention will now be further described, by way of example only, with reference to the accompanying drawings in which:

FIG. 7 (and it's selective enlargement FIG. 7a) is a schematic of a first example of an SLA for use in the circuit of FIG. 1;

FIG. 12 (and signal depictions at FIGS. 12a–12d) is a schematic of a second embodiment employing two SLAs;

DETAILED DESCRIPTION OF EXEMPLARY EMBODIMENTS

Figure 1:
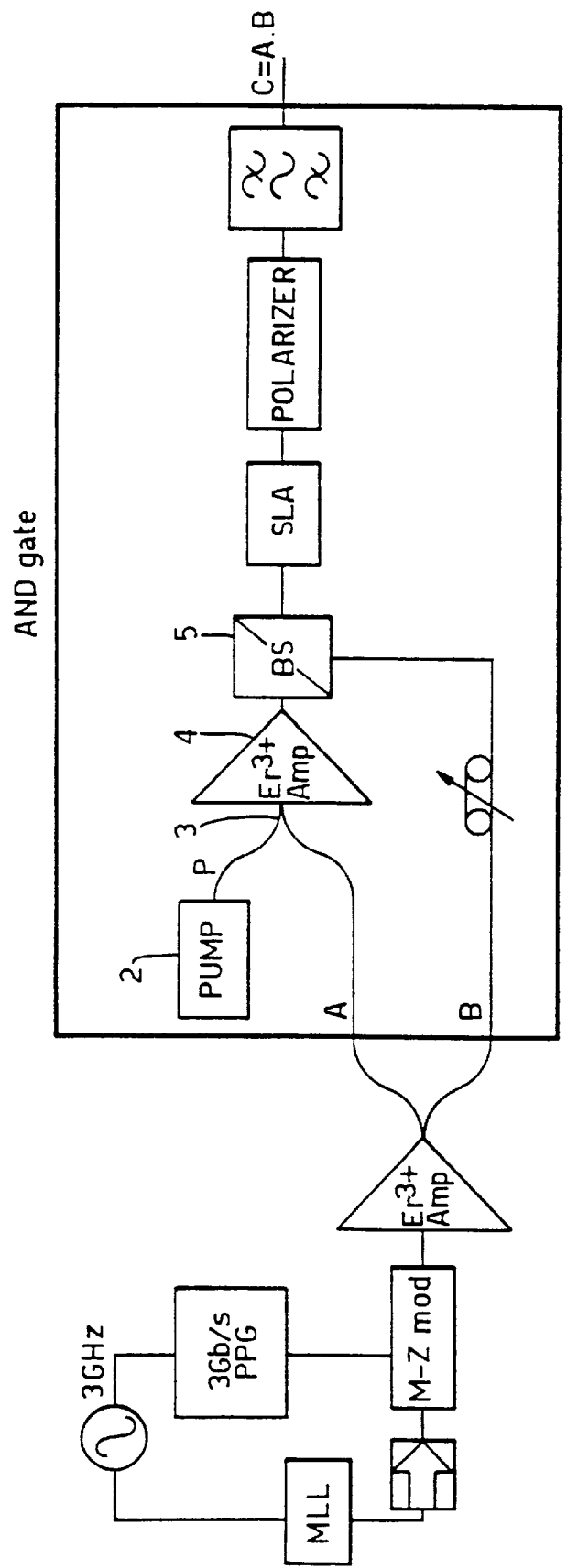
FIG. 1 is a schematic of a first embodiment.

An optical AND gate includes a semiconductor laser amplifier (SLA) 1 and inputs for a first optical signal A and a second optical signal B. A source 2 generates a third optical signal P. The first optical signal A is combined with the third signal P in an optical coupler, and fed to a fibre amplifier 4. In this example, the fibre amplifier is an erbium-doped device.

The second optical signal B is combined with the output of the fibre amplifier using a polarising beam-splitter/combiner 5. The combined signals are then input to the SLA 1. The output from the SLA is then passed through a polarisation analyser 6 and bandpass filter 7 to provide the output from the AND gate.

In this first example, the SLA is a strained-layer 8-well MQW (multiple quantum-well) buried heterostructure device (FIG. 7). It is 1000 $\mu$m long and 200 $\mu$m wide and has a gain peak in the region of 1.56 $\mu$m when biased at 340 mA. The active region has a width w of 1.2 m. It comprises alternate layers of $In_{0.53}Ga_{0.47}As$ 40 Å deep and $In_{0.37}Ga_{0.63}As$ 60 Å deep. These quantum wells are bounded between upper and lower layers of InGaAsP 500 Å deep. Using this device, the results shown in FIGS. 2, 3 and 4 were obtained.

Figure 8A:
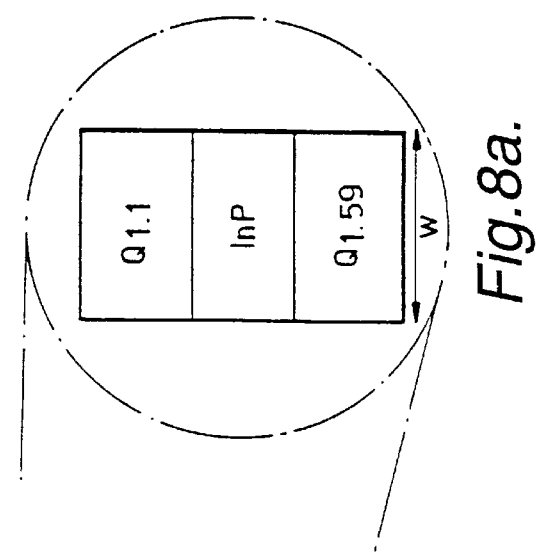
FIG. 8 (and it's selective enlargement FIG. 8a) is a schematic of a second example of an SLA for use in the circuit of FIG. 1.
Figure 8:
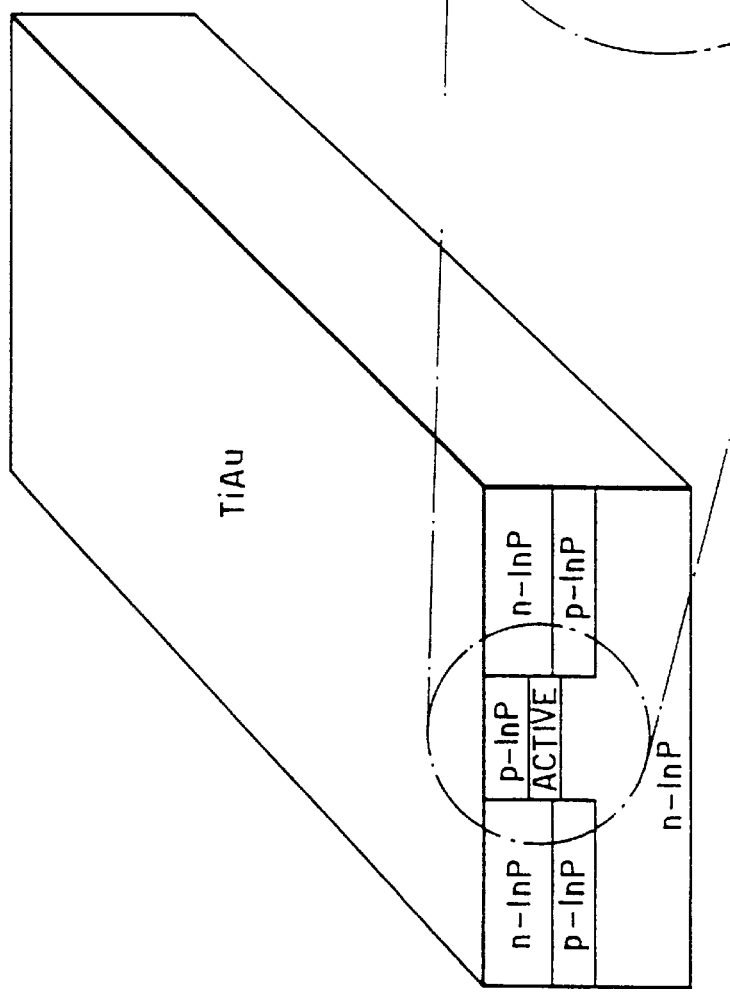

FIG. 8 shows an alternative bulk SLA which might be used in the circuit of FIG. 1. Here the device is 500 $\mu$m long and 200 $\mu$m wide has an active region with a width w of 1.17 $\mu$m. An InP core 0.23 $\mu$m deep is confined between an upper layer $Q_{1.1}$ 0.21 $\mu$m deep and a lower layer $Q_{1.59}$ 0.2 $\mu$m deep.

The third of the input signals, P, the pump signal, is a continuous wave signal derived from a tunable external-cavity semiconductor laser such as model no. Intun 1500 manufactured by Radians Innova. It operates in this example at a wavelength of 1555.08 nm. The second signal A is at a wavelength of 1553.15 nm and is combined with the first signal in the coupler 3 which may be a 3 dB fused fibre coupler. The polarisations of A, B and P are optimised for maximum transmission through the polarising beam splitter 5, which may be a SIFAM high birefingence fibre polarization beamsplitter. The beamsplitter ensures that B is orthogonal to A and P.

The output from the SLA is passed through the polarising filter which in this example is a fibre polariser adjusted to extinguish the signals in the A+P polarisation plane. This is followed by a 0.6 nm fibre-grating bandpass filter centred at 1551.20 nm. As will be further described below, this serves to isolate the AND signal. A delay line is provided in the input path for the second signal 13 to the beam splitter 5.

For convenience, in the example shown in the Figure the inputs A and B are generated from a common source. In practice the input at A might typically be provided, for example, by the header of a packet carried on an optical network and B might be a target word to be ANDed with the header for the purposes of header recognition, as described in our above cited co-pending international application.

In the circuit shown in FIG. 1, the source for A and B is an external cavity semiconductor laser (MLL) fundamentally mode-locked at 3 GHz using an amplified electrical signal from a synthesised microwave generator. The output pulses from the mode-locked laser are ~0.2 nm in spectral width and of ~20 ps duration as measured on a streak camera. The microwave generator is also used to synchronise a pulse-pattern generator PPG which in turn drives a Lithium Niobate Mach-Zehnder modulator. The optical pulses from the mode-locked laser are amplified and passed through the M-Z modulator. The resulting pulse pattern is then amplified again and split between signal paths A and B using a fused fibre coupler. There is a length difference (time delay) between paths A and B, which can be fine-tuned using a variable length fibre delay line to synchronise bit arrivals in the SLA.

Figure 2:
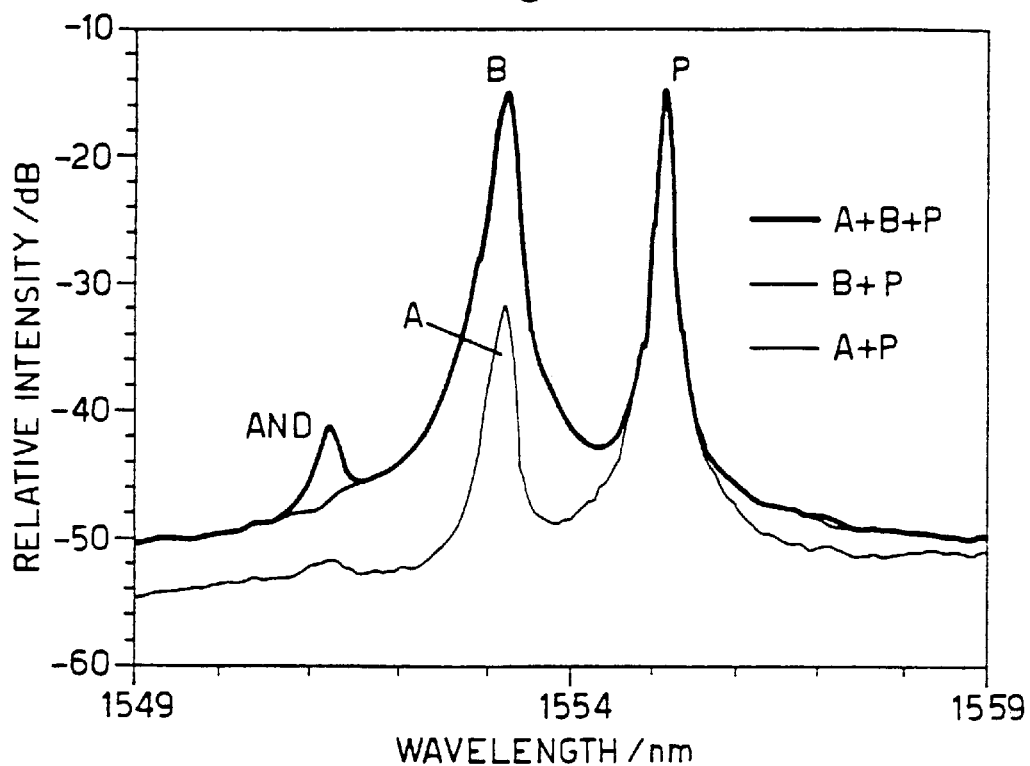
FIG. 2 shows the output spectrum of the SLA of FIG. 1 after the polariser, with RZ data and the polariser set in B polarisation plane.

In use, a 16-bit optical sequence of pulses was generated to demonstrate the AND function. The optical power levels measured at the input to the SLA were +9 dBm for A+P in combination and -1dBm for signal B. The pump is of a high enough power to prevent modulation of the SLA spontaneous emission by A and B. The ratio of A to P is –11 dB as measured on an optical spectrum analyser. The optical spectrum measured at the output of the polariser (set for B polarisation plane) is shown in FIG. 2 for combinations of A on/off and B on/off. The AND signal is indicated. This signal is produced as an FWM sideband generated from the orthogonally polarised signal B in the presence of the modulation of the carrier density distribution resulting from the beating between the pump P and the signal A. This AND signal is entirely extinguished when A or B is absent. The small average power level of the AND signal in the trace is largely due to the small number of is in the AND pattern.

Figure 9:
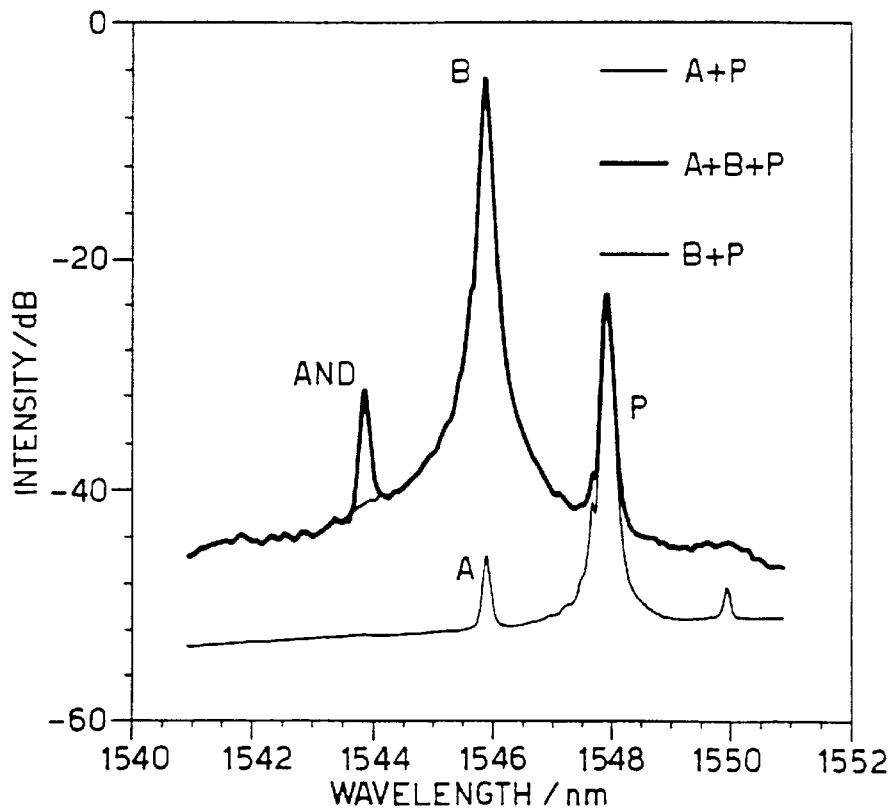
FIG. 9 shows the output spectrum of the SLA of FIG. 1 after the polariser when A and B are at 1546 nm using NRZ data.

FIG. 9 shows the output of the AND gate when the input signals A and B are NRZ-modulated at a wavelength of 1546 nm. As in the first example above, a strong AND signal is produced at a wavelength in the region of 1544 nm and can be selected by an appropriately tuned filter.

Figure 11:
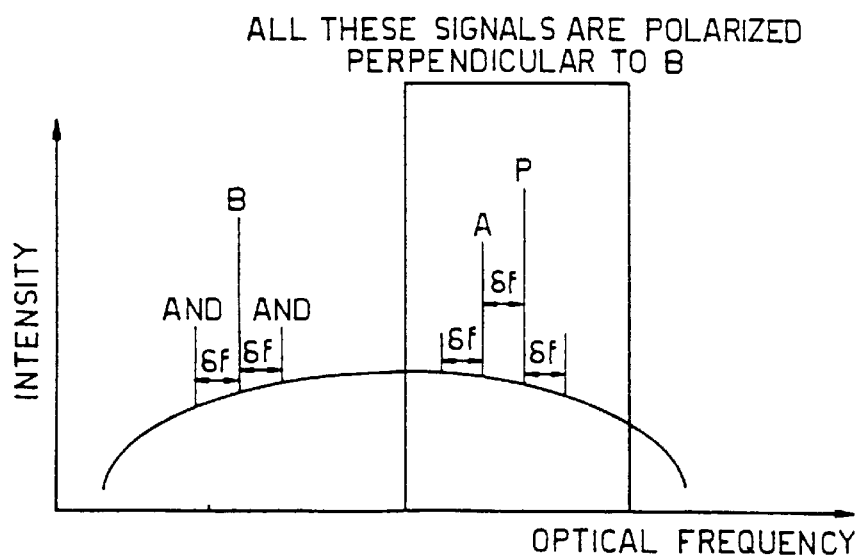
FIG. 11 is a schematic illustrating the output of the system of FIG. 1 when signals B and A are at different optical frequencies.

Although in these examples A and B are at a single common wavelength, the invention is by no means limited to operation in this fashion. FIG. 11 shows schematically the expected form of the output when A and B are at different optical frequencies. At the output, A and P can be selected out using a polarising filter as described above and then one of the sidebands of B corresponding to the AND product is selected with an appropriately tuned bandpass filter.

Figure 3:
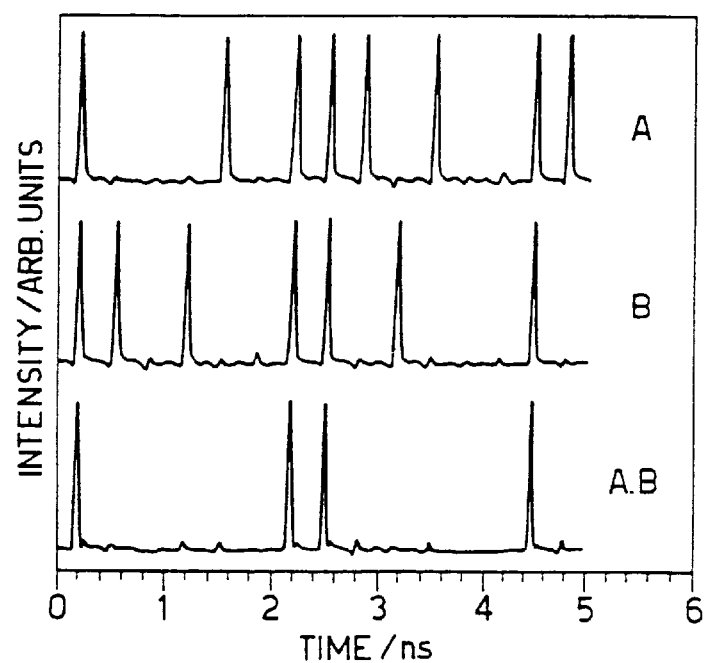
FIG. 3 shows oscilloscope traces for signals A, B, and AND at the output of the final filter.

FIG. 3 shows the normalised traces from a photodiode used to detect the output from the gate, as captured on a sampling oscilloscope. The top trace shows the pulse train A at the output of the final filter with the filter and polariser adjusted to isolate A. The middle trace of FIG. 3 shows the same for the B signal, but with the polariser adjusted to show B. The bottom trace shows the output of the AND gate resulting from the above input data sequences. The AND gate can be seen to give a pulse only when pulses from both A and B are coincident in the SLA.

Figure 4:
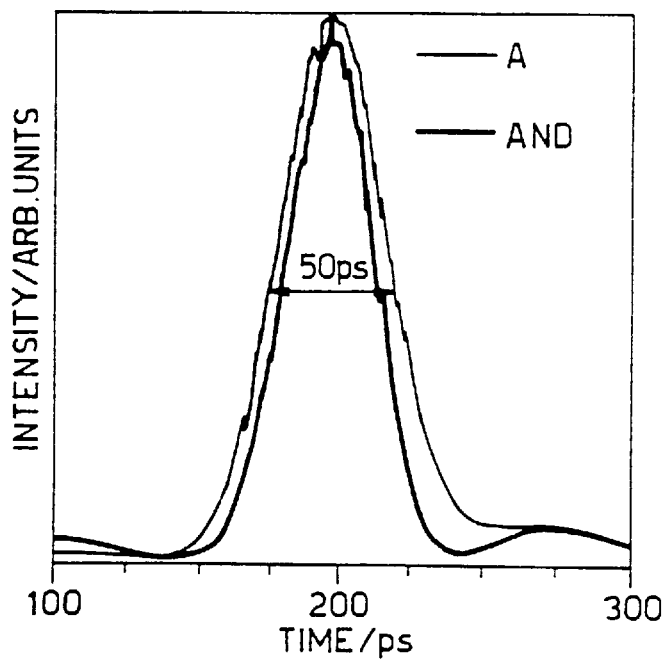
FIG. 4 shows a comparison of input pulse width with the output AND signal.

The pulse shape for signal A is compared with the AND signal pulse shape in FIG. 4. There is no pulse broadening, thus demonstrating the ultrafast operating speed of the AND gate. The width of the AND pulse is narrower than the input pulse due to the correlation between A and B in the SLA.

The device is found to be remarkably stable in operation. The polarising beam splitter ensures orthogonality of the A+P and B signals so the most critical adjustment is to the polariser as this determines the extinction ratio. The device can be improved by using polarisation maintaining fibre on either side of the SLA.

Figure 10:
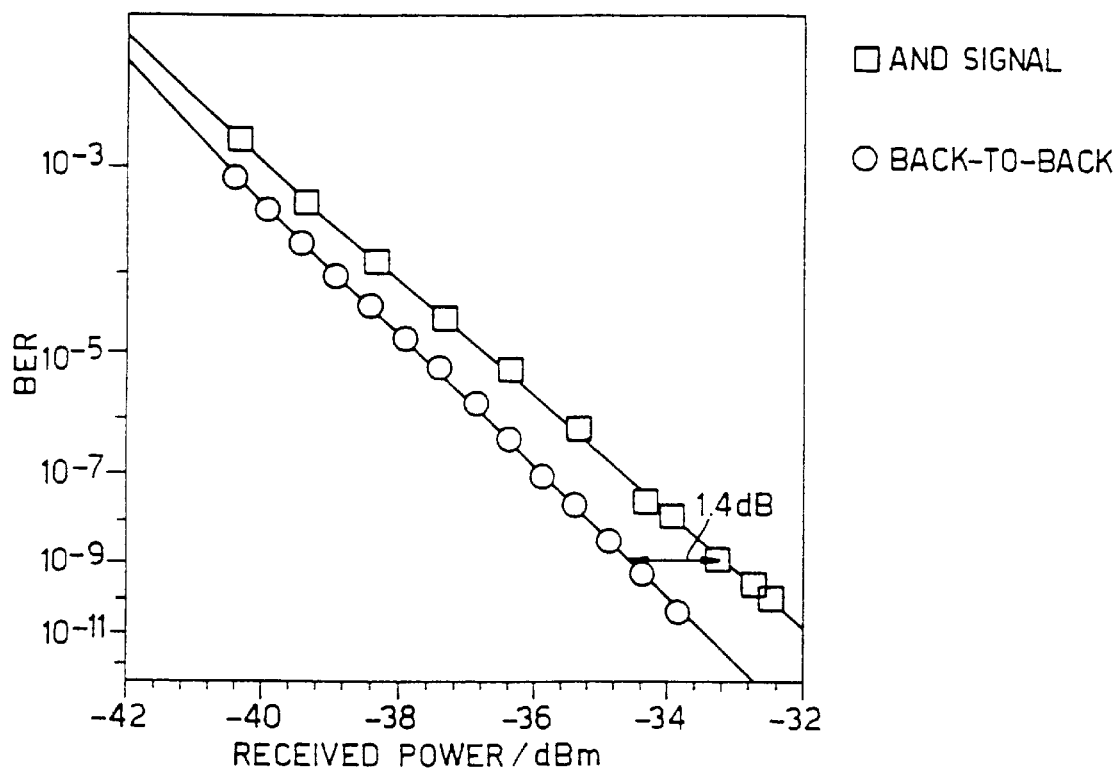
FIG. 10 is a plot illustrating bit-error ratio (BER) achieved for NRZ data at ~2.5 Gbit/s.

In the plot shown in FIG. 10, an AND signal BER (bit-error-ratio) is obtained by delaying the first input A relative to B by one complete pattern length. Therefore in the AND gate the pattern is combined with a delayed version of itself. The AND signal is therefore the original pattern. The second plot on the graph shows the output "back-to-back" without the AND gate in place to determine the baseline receiver sensitivity.

For prototyping and testing, it is convenient to construct the circuits described above using discrete components which are commercially available with fibre pigtails, thus allowing rapid and relatively simple construction by splicing or using fibre connectors. The use of components joined with fibre connectors facilitates the measurement of key parameters at critical points in the device, such as at the SLA input port. In commercial realisations of the circuit however it may be advantageous to form the circuit as an integrated device. This serves both to reduce manufacturing costs, to reduce the space taken by the circuit, and to increase the reliability of the circuit. Performance may also be improved by the elimination of fibre coupling losses.

Figure 13:
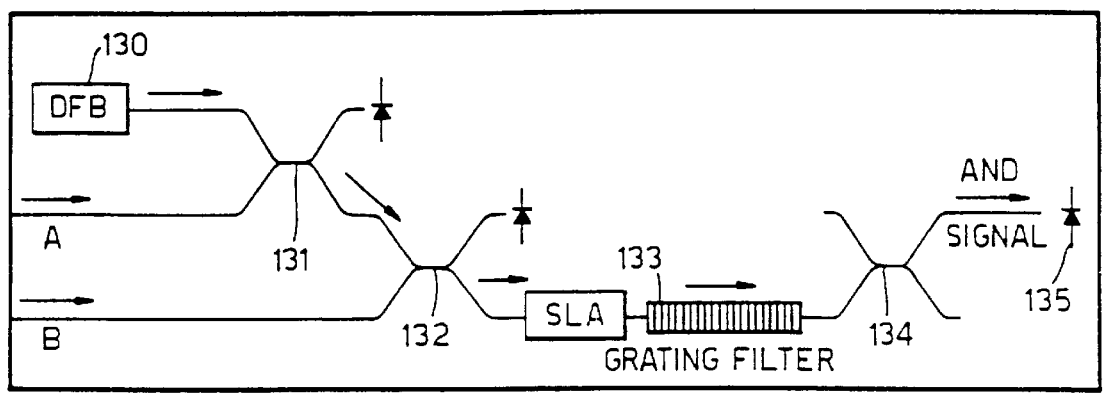
FIG. 13 shows an integrated planar circuit implementation of the circuit of FIG. 1 on InP/InGaAsP.

FIG. 13 shows an integrated implementation of the circuit of FIG. 1, in which signal A combines with a co-polarised pump signal, which is produced by a high power DFB laser 130 fabricated on the chip, in a directional coupler 131. This may be fabricated using conventional photolithographic and epitaxial techniques on Indium Phosphide using an Indium Gallium Arsenide Phosphide active region and waveguide layers. The combined signal is then coupled with the B signal in a polarisation coupler 132 before entering an integrated SLA. At the output of the SLA is an optical filter 133 with a grating designed to pass signals at the wavelength corresponding to the AND sideband. Finally, the filtered signal is passed through another polarisation coupler 134 to remove the remaining unwanted signals and is detected on a photodiode. Other photodiodes are included on the chip to monitor the circuit and to provide data for element management. Optionally, additional SLAs might be integrated on the chip to amplify the signals. These however may distort ultra-short optical pulses so it may be preferable to use external EDFAs (erbium-doped fibre amplifiers) where application is desired. As a further alternative, a hybrid planar structure might be used with erbium-doped silica waveguides integrated with the circuit on a silicon substrate.

Figure 14A:
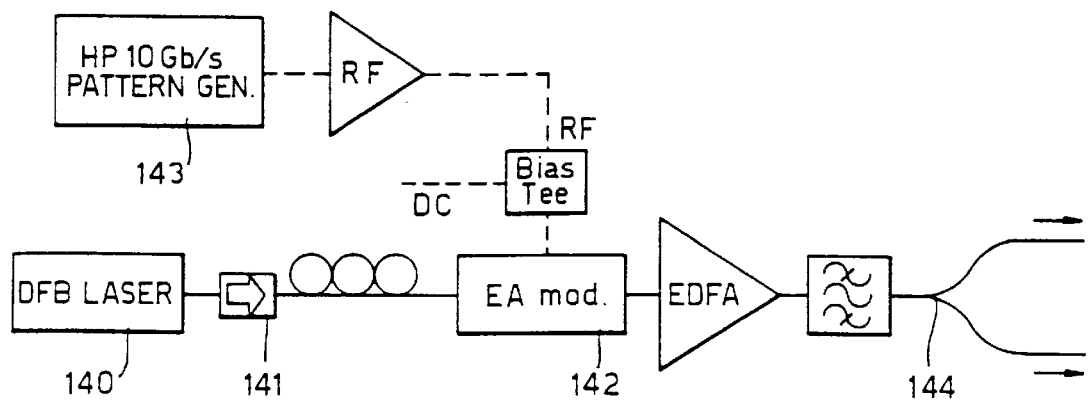
FIGS. 14a and 14b show the signal source and signal receiver used in a demonstration of the circuit of FIG. 1 at 10 Gbit/s.
Figure 14B:
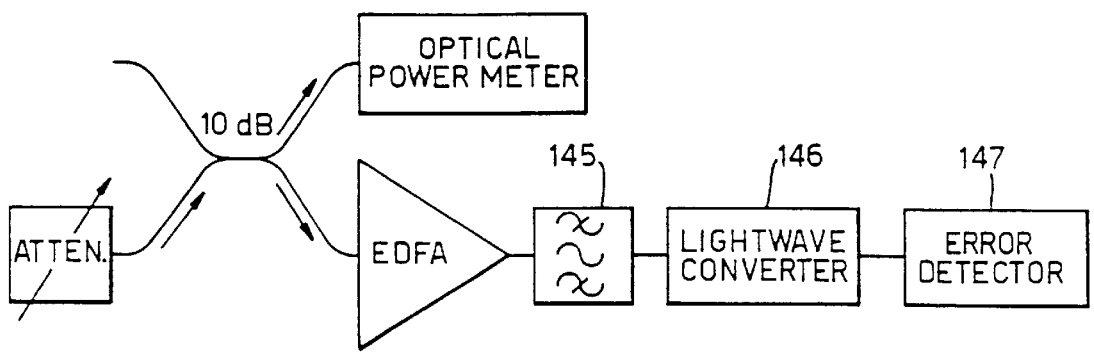

FIGS. 14a and 14b show a modified signal source, and signal receiver respectively used in demonstrating the operation of the circuit of FIG. 1 at a bit-rate of 10 Gbit/s.

Light from CW DFB laser 140 at 1551.24 nm is passed through a 60 dB optical isolator 141 and coupled into an EAM 142 (electroabsorption modulator) with a modulation bandwidth in excess of 10 GHz. A 9.8174 Gbit/s electrical PRBS of $2^7-1$ bit-length from a Hewlett Packard 10 Gbit/s PPG 143 is amplified by a wideband amplifier and applied to the EAM via a bias T. The resultant intensity-modulated optical output is then amplified by an EDFA to an average optical power level of about +10 dBm. This amplified optical signal is then filtered by a tunable filter with a 1.2 nm pass-band to remove excess spontaneous emission from the EDFA. The signal is then split using a 10 dB coupler 144 such that signal A incurs an extra 10 dB loss relative to signal B. The two signals then enter the AND gate via two optical attenuators. The AND circuit was constructed as previously described with reference to FIG. 1, but with some minor modifications. The polarisation combiner was changed to a JDS polarising beam splitter with a lower insertion loss. As this combiner did not have a fourth port through which the coupled power. could be monitored, a fused fibre coupler is placed between it and the SLA as a 10 dB power tap. The SLA is a bulk active layer device as described above with respect to FIG. 8. This bulk layer device has been found to offer more efficient FWM than, for example, the MQW SLA of FIG. 7.

The output from the AND gate is detected by the optically pre-amplified receiver shown in FIG. 14b. This consists of an EDFA followed by a tunable optical filter 145 with a inm pass-band and a 15 GHz Hewlett Packard light wave convertor 146. The electrical output from the light wave convertor was then fed into either an error detector 147 or to a digitising oscilloscope.

Figure 17:
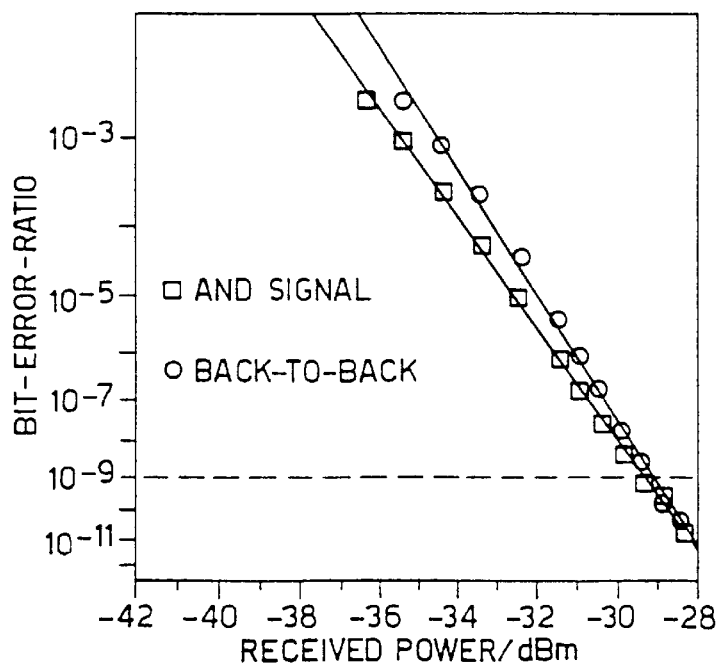
FIG. 17 shows bit-error-ratios at 10 Gbit/s.
Figure 15:
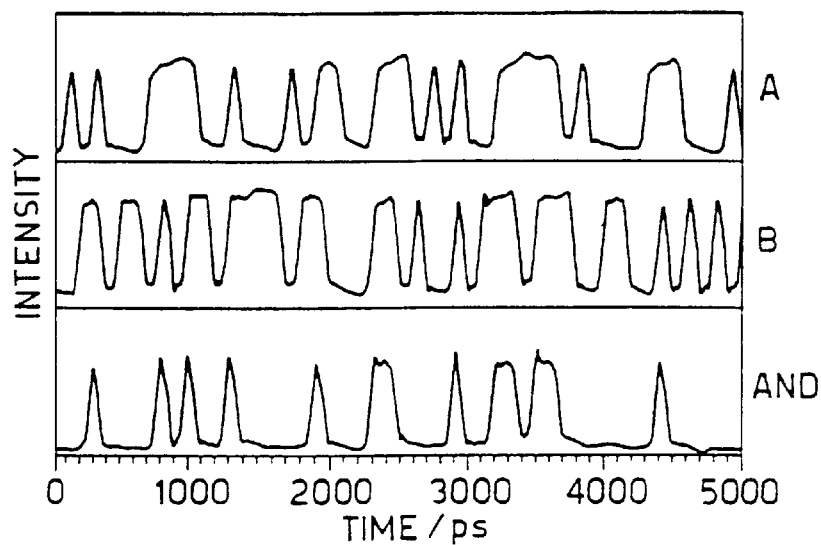
FIG. 15 shows oscilloscope traces obtained at 10 Gbit/s.
Figure 16:
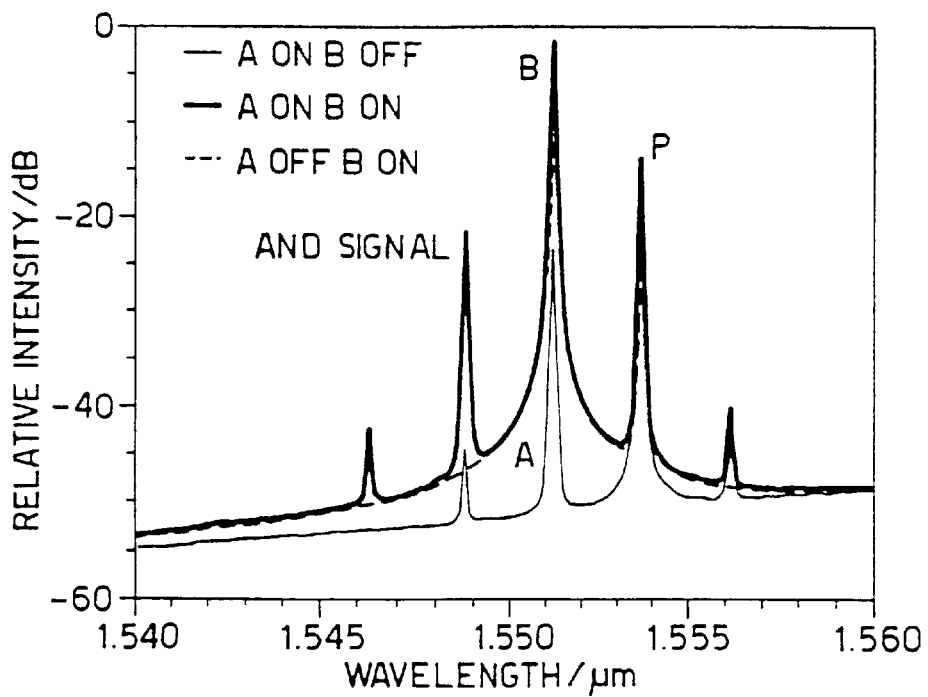
FIG. 16 shows output spectra in B polarisation plane obtained at 10 Gbit/s.

Using the circuit, measurements were taken to verify that the gate was performing the required AND function at 10 Gbit/s. The A and B signals at optical power levels of +8.2 dBm and +2.7 dBm respectively were injected into the SLA biased at 310 mA. The wavelength of the pump beam P was set at 1553.8 nm and at an optical power of +9.8 dBm. The EAM was biased at −3 V and slightly overdriven by the data signal to ensure that the 1 states do not extend beyond the allocated 100 ps time slot. This measure was necessary to ensure that when a 10 pattern and a 01 pattern from inputs A and B arrived at the AND gate simultaneously, the wings of the is did not overlap causing an AND output signal that appeared like poor extinction. This driving condition was not necessary when taking error ratio measurements as the bit overlap was outside the sampling window, but here it aided the interpretation of the results. A short sequence from the AND, A and B data patterns at the output of the AND gate was captured on the oscilloscope by proper adjustment of the filters and polarisation of the SLA. The resulting traces are shown in FIG. 15. FIG. 16 shows the optical spectra obtained at the output of the polariser prior to filtering and demonstrate an excellent extinction ratio better than 20 dB. FIG. 17 shows the results of measurements of the BER at 10 Gbit/s. This measurement was made with the SLA biased at 285 mA and slightly cooled to 14° C., as this seemed to improve FWM efficiency. The optical power levels at the input to the SLA were +6.4 dBm, +2.8 dBm and +10.8 dBm for A, B and P respectively. The bias voltage on the EAM was reduced to 1.8 V to lower the insertion loss of the modulator and improve the system performance.

Figure 18:
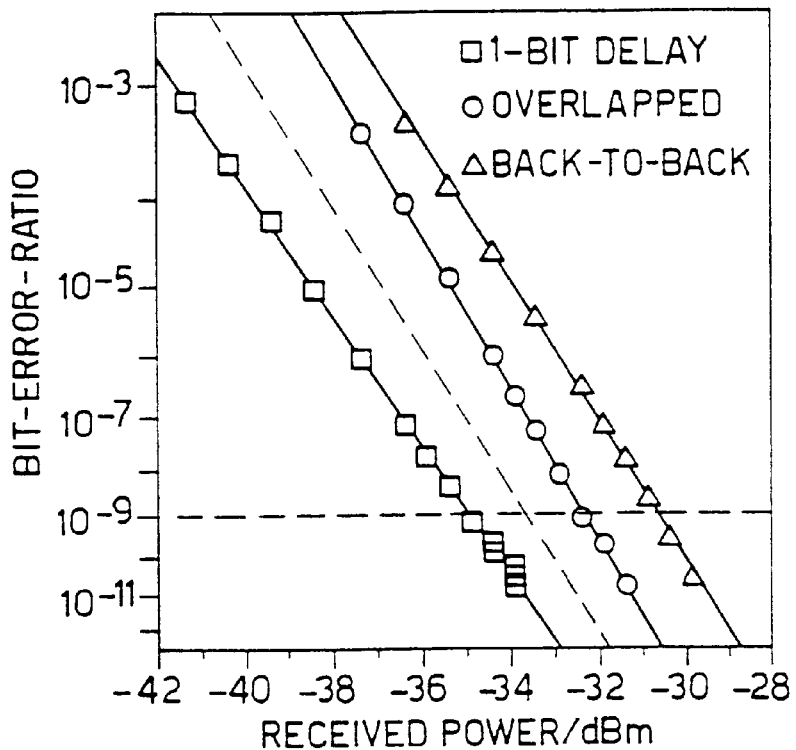
FIG. 18 shows bit-error-ratios at 10 Gbit/s measured using a modified circuit.
Figure 19:
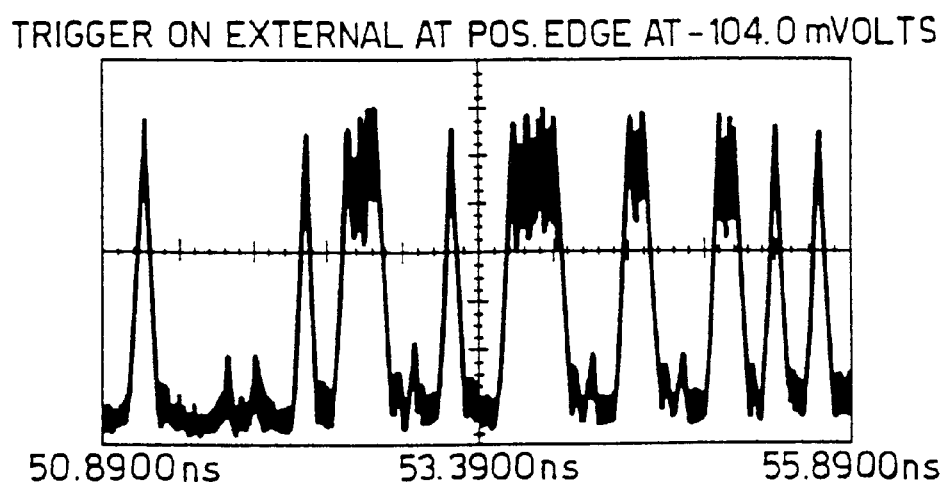
FIG. 19 is an oscilloscope trace showing the output of the circuit at 10 Gbit/s.

Further measurements were made with a 10 GHz bandwidth pre-amplifier added after the light wave convertor to band-limit the pulses entering the error-rate detector. A 600 m length of dispersion-compensating fibre was inserted in the input B path to enable longer patterns to overlap at the input to the AND gate. The EAM transmitter was biased at −3 V and driven by a 10 Gbit/s $2^{13}-1$ PRBS. The exact bit-rate was changed by 384 kHz to give either exactly overlapped patterns at the AND gate input or patterns delayed by one-bit. The wavelength of the source DFB was 1551.2 nm and P was 1553.3 nm. The power levels measured at the input to the SLA were −1 dBm, +1.0 dBm and +7.8 dBm for A, B and P respectively. The SLA was biased at 291 mA and maintained at a temperature of 15° C. FIG. 18 shows the BER results obtained in this example, and FIG. 19 shows an oscilloscope recording of the AND signal output.

With the AND gate operating as described in the immediately proceeding paragraphs, correlation measurements were made to demonstrate that the response of the AND gate is sufficient to handle 100 Gbit/s data pulses. A first measurement was made by adjusting the input signal repetition rate so as to cause the relative arrival times of pulses at the A and B inputs of the AND gate to vary linearly. This allowed one stream of pulses to pass through the other and perform a cross-correlation between the two pulse streams. Measurements were also made with a commercial autocorrelator on the output of the AND gate. The source signal was provided by a CWDFB laser at 1551 nm injected into a 10 GHz bandwidth EAM.

Figure 20:
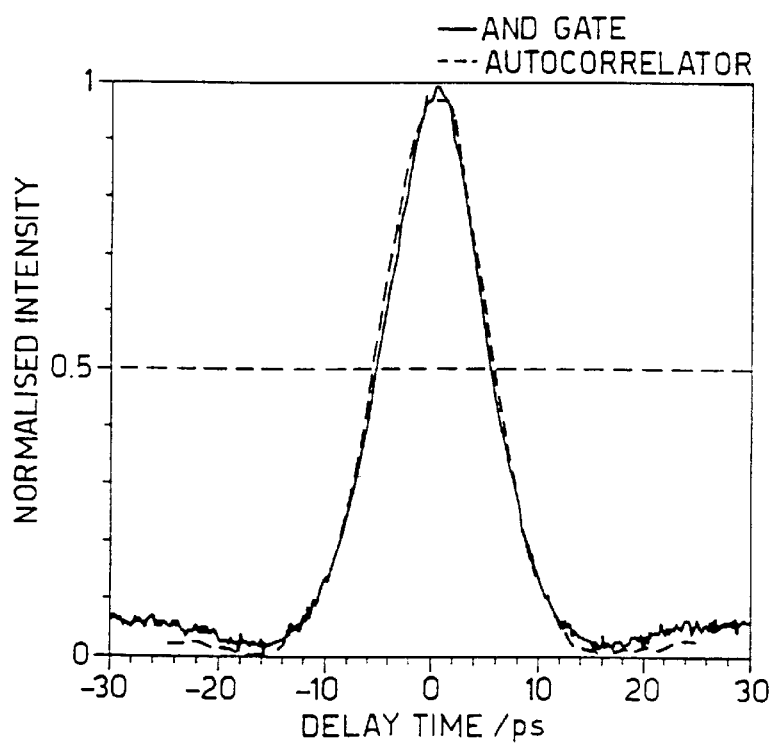
FIG. 20 is a graph showing correlation profiles.

FIG. 20 shows the results obtained. The half width measured using cross-correlation in the AND gate was 10.7 ps, and the half width of the trace from the autocorrelator was 11.6 ps. If the pulse profile is assumed to be in the form of a $sech^2$ function, then the actual pulse width is a factor of 1.55 less than the correlation width, giving a value of 7 ps. This value for the pulse width demonstrates the AND gate can operate at data rates in excess of 100 Gbit/s.

FIG. 12 shows another embodiment using two SLAs connected in series. A continuous wave pump, which may be generated as described above, is input to SLA 1 together with signal A. The filtered output from SLA 1 is then input to SLA 2 together with the second optical signal B. In the first SLA, a non-degenerate four-wave mixing process between the signal A and the pump generates an optical signal at a new wavelength $\lambda_{PC}$ given by $\lambda_{PC}=\lambda_P\lambda_S/(2\lambda_S-\lambda_P)$ ($\lambda_P$ is the wavelength of the pump and $\lambda_S$ the wavelength of the signals A and B). The new signal at $\lambda_{PC}$ is selected at the output of the SLA using a first bandpass filter BPF1. Non-degenerate four-wave mixing of the output from the first SLA together with signal B in the second SLA generates a further optical signal at another new wavelength $\lambda_C$ given by $\lambda_C=\lambda_S\lambda_{PC}/(2\lambda_{PC}-\lambda_S)$. This signal is selected using a second bandpass filter BPF2 to produce the signal C which can occur only if the signals at A and B are present simultaneously, i.e. it corresponds to the AND product of A and B. This embodiment offers the advantage of avoiding the need for polarisation control of the signals if implemented using polarisation-independent FWM in each of the SLA's. It is therefore particularly suitable for use at high bit rates at which polarisation presents particular difficulties.

Each of the two SLAs may be a discrete device and may comprise, for example, an MQW semiconductor laser amplifier as described with respect to FIG. 7. The SLAs may be connected to their respective inputs and to each other by monomode optical fibre. The bandpass filters may conveniently be formed as fibre gratings.

Alternatively, the two SLAs may be formed, together with the filters, as a single integrated device.

An optical AND gate as described above may be used in an optical telecommunications system for header recognition. For a fuller description of this use of the device reference is made to our co-pending international application PCT/GB94/00397.

Figure 5:
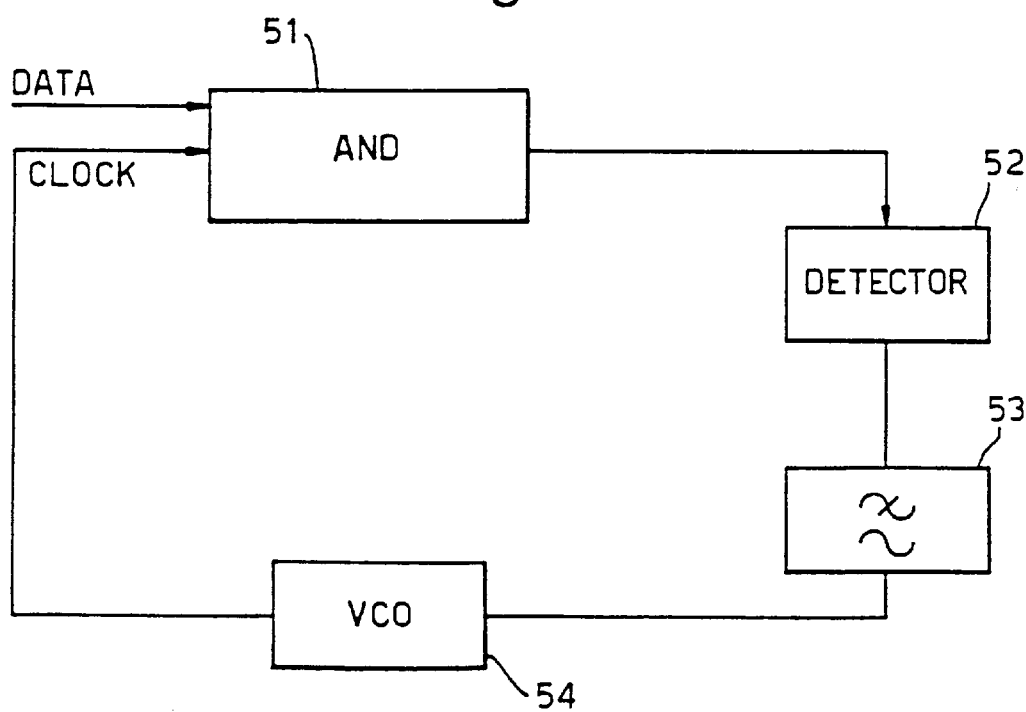
FIG. 5 is a schematic of a PLL using the AND gate of FIG. 1.

Another example of a field of use for the AND gate is in an optical phase-locked loop. Such a loop may be used, for example, in recovering a clock at a sub-multiple of the clock rate of an input datastream. FIG. 5 shows schematically a circuit appropriate for this. The output of the AND gate 51, which is constructed as in the example above, passes to a photoelectric detector 52. The electrical output from the detector is filtered by a low-pass filter 53 and then used to control an optical voltage-controlled oscillator 54 which generates the output optical clock stream. This optical VCO may comprise a fibre ring-cavity mode-locked laser incorporating a fibre-stretcher e.g. a piezo-electric drum which is controlled by the signal from the low-pass filter. A suitable laser is described in our co-pending application PCT/GB94/00863. This clock stream together with the original datastream provide the two inputs of the AND gate 51 (equivalent to signals A and B in the example above). The AND gate 51 therefore functions as the phase-detector for the loop.

Figure 6A:
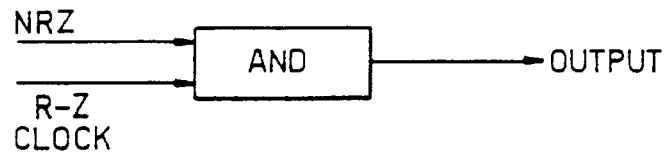
FIGS. 6a to 6d illustrate the use of the AND gate for NRZ to RZ conversions.
Figure 6B:
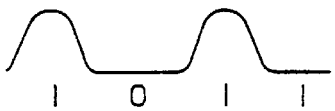
Figure 6C:
Figure 6D:

As well as such use of the gate for clock recovery, it may be used for signal regeneration, or, for example, for modulating an RZ (return to zero) clock with an NRZ datastream. FIG. 6a illustrates this with FIG. 6b showing the NRZ datastream, 6c the RZ clock, and 6d the output pulse sequence.

Figure 21:
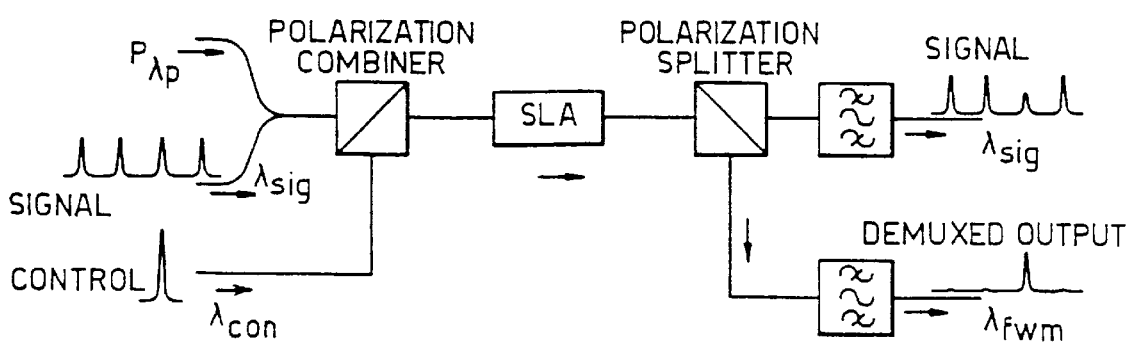
FIG. 21 is a demultiplexer incorporating an AND gate embodying the present invention.

A further important field of use for AND gates embodying the present invention, is in demultiplexing optical pulse streams which may take the form, for example, of OTDM frames. FIG. 21 is a schematic of an all-optical demultiplexer using the AND gate of the present invention. In this implementation, instead of using a polarising filter to extinguish the A and P signals, a polarisation splitter is used on the output of the SLA. This separates the AND sideband output at $\lambda_{fwm}$ to provide the demultiplexed output, and transmits on the signal which is orthogonally polarised with respect to the AND output. The fact that the unswitched channels are still accessible is a significant advantage of this demultiplexer. Such a demultiplexer is well-suited to demultiplexing in a linear bus configuration where the channels are to be dropped at geographically separated nodes in a network. It is however less suitable for use in a "drop and insert" node, as the through signal has a significant proportion of the switched channel remaining.

Polarisation insensitivity is important in demultiplexing, as polarisation tends to wander with temperature and stress variation in the transmission fibre. The polarisation sensitivity of the AND gate of the present invention might be eliminated either by reconfiguring the device, and in particular by using the two-SLA form of the AND gate, or by the use of fast automatic polarisation controllers as described in F. Heismann et al "Polarisation-independent photonic switching system using fast automatic polarisation controllers" IEEE Photonics Technology Letters Vol. 5 No. 11, 1993, on the input that can compensate for polarisation variations in the transmission fibre.

What is claimed is:

1. An optical AND gate comprising:
    at least one semiconductor laser amplifier (SLA) and inputs for first and second optical signals;
    the AND gate being arranged to produce an output corresponding to the AND product of the first and second optical signals by four-wave mixing (FWM), wherein the first and second optical signals are so substantially equal in wavelength that they differ in wavelength, if at all, by less than 0.8 nm.

2. An optical AND gate comprising:
    at least one semiconductor laser amplifier (SLA) and inputs for first and second optical signals;
    the AND gate being arranged to produce an output corresponding to the AND product of the first and second optical signals by four-wave mixing (FWM), wherein the first and second optical signals are substantially equal in wavelength; and
    an input for a third optical signal arranged, by an interaction with at least one of the first and second optical signals, to promote FWM within the at least one SLA.

3. An optical AND gate according to claim 2, wherein the third optical signal comprises a continuous wave (cw) signal.

4. An optical AND gate comprising:
    at least one semiconductor laser amplifier (SLA) and inputs for first and second optical signals;
    the AND gate being arranged to produce an output corresponding to the AND product of the first and second optical signals by four-wave mixing (FWM), wherein the first and second optical signals are substantially equal in wavelength;
    an input for a third optical signal arranged, by a interaction with at least one of the first and second optical signals, to promote FWM within the at least one SLA;
    wherein the gate comprises a single SLA arranged to receive the first optical signal and the third optical signal, the first and third optical signals being co-polarized, and arranged to receive the second optical signal in an orthogonal polarization state to the first and second signals; and
    means for selecting a sideband output from the SLA corresponding to the AND product of the second optical signal with the first optical signal and third optical signal.

5. An optical AND gate according to claim 4, further comprising a polarizing beam-splitter/combiner on the input side of the SLA for receiving the orthogonally polarized signal.

6. An optical AND gate according to claim 4, wherein the means for selecting the output sideband includes a polarizing filter adjusted to extinguish the output signal in the polarization plane of the first and third input signals.

7. An optical AND gate comprising:
    at least one semiconductor laser amplifier (SLA) and inputs for first and second optical signals;
    the AND gate being arranged to produce an output corresponding to the AND product of the first and second optical signals by four-wave mixing (FWM), wherein the first and second optical signals are substantially equal in wavelength;
    an input for a third optical signal arranged, by a interaction with at least one of the first and second optical signals, to promote FWM within the at least one SLA;
    a first SLA arranged to receive the first optical signal together with the third optical signal at a different wavelength than the first optical signal; and
    means for selecting a sideband output from the first SLA, a second SLA arranged to receive the selected sideband output from the first SLA together with the second optical signal, and means for selecting a sideband in the output of the second SLA corresponding to the AND product of the said first and second optical signals.

8. A method of ANDing two optical signals, comprising:
    applying first and second optical signals to an optical AND gate comprising at least one semiconductor laser amplifier (SLA) and producing an output from the at least one SLA corresponding to the AND product of the first and second optical signals by four-wave mixing (FWM), wherein the first and second optical signals are substantially equal in wavelength.

9. A method according to claim 8, further comprising the steps of inputting a third optical signal, said third optical signal interacting with at least one of the first and second optical signals, thereby promoting FWM within the at least SLA.

10. A method according to claim 9, wherein the third optical signal comprises a continuous wave signal (cw).

11. A method according to claim 10, further comprising:
applying the third continuous wave signal and the first optical signal to a first semiconductor laser amplifier;
selecting a sideband output from the first semiconductor laser amplifier;
applying said sideband together with the second optical signal to the input of a second SLA; and
selecting a sideband in the output from the second SLA corresponding to the AND product, the third optical signal having a different wavelength than the first and second optical signals.

12. A method according to claim 9, wherein one of the first and second optical signals is input to the SLA in an orthogonal polarization state to the other of the first and second optical signals, the one optical signal and the third optical signal interacting by a process of beating to generate a dynamic grating, the other optical signal scattering off the dynamic grating.

13. A method according to claim 12, wherein the output from the SLA is passed through a polarizing filter adjusted to extinguish the output signal in the polarization plane of the one optical signal and third optical signal.

14. A method of converting an NRZ signal to a RZ signal comprising ANDing the NRZ signal with an RZ clock signal by a method according to claim 8.

15. A method of demultiplexing an optical pulse stream characterised by ANDing the optical pulse stream with a control signal, by a method according to claim 8.

16. An optical AND gate comprising:
a semiconductor laser amplifier (SLA) having inputs for first second and third optical signals, the first and third optical signals being co-polarized and interacting in the SLA by a process of four-wave mixing (FWM); and
means for selecting an FWM sideband output from the SLA, wherein the input for the second optical signal is arranged to receive said sideband output signal othogonally polarized with respect to the first and second optical signals, the first and third optical signals beating to generate a dynamic grating, interaction of the second optical signal with the dynamic grating producing the FWM sideband corresponding to the AND product of the orthogonally polarized second optical signal with the first and second optical signals.

17. An optical AND gate according to claim 16, wherein the third optical signal comprises a continuous wave (cw) signal.

18. A method of ANDing optical signals comprising the steps of:
inputting first and second optical signals, and a third optical signal co-polarized with respect to the first optical signal, to an optical AND gate;
applying the first and third optical signals to a semiconductor laser amplifier (SLA);
generating four-wave mixing (FWM) in the SLA; and
selecting a sideband in the output from the SLA corresponding to the AND product, by applying the second optical signal to the SLA that is orthogonally polarized with respect to the first and third optical signals, the selected sideband corresponding to the AND product of the second orthogonally polarized optical signal with the first and second optical signals.

19. A method according to claim 18, wherein the third optical signal comprises a continuous wave (cw) signal.

20. An optical phase-locked loop (PLL) comprising an optical phase detector and a local oscillator (VCO) controlled in dependence upon the output from the optical phase detector wherein the optical phase detector comprises an optical AND gate comprising:
at least one semiconductor laser amplifier (SLA) and inputs for first and second optical signals;
the AND gate being arranged to produce an output corresponding to the AND product of the first and second optical signals by four-wave mixing (FWM), wherein the first and second optical signals are substantially equal in wavelength.

21. An optical demultiplexer including an optical AND gate comprising:
at least one semiconductor laser amplifier (SLA) and inputs for first and second optical signals;
the AND gate being arranged to produce an output corresponding to the AND product of the first and second optical signals by four-wave mixing (FWM), wherein the first and second optical signals are substantially equal in wavelength.

22. An optical AND gate, comprising:
at least one semiconductor laser amplifier (SLA) and inputs for first and second optical signals;
the AND gate being arranged to produce an output corresponding to the AND product of the first and second optical signals by four-wave mixing (FWM), wherein the first and second optical signals are substantially equal in wavelength;
an input for a third optical signal arranged, by interaction with at least one of the first and second optical signals to promote FWM within the at least one SLA;
wherein the gate comprises a single SLA arranged to receive the first optical signal and the third optical signal, the first and third optical signals being co-polarized, and arranged to receive the second optical signal in an orthogonal polarization state to the first and second optical signals; and
a polarizing filter for selecting a sideband output from the SLA corresponding to the AND product of the second optical signal with the first optical signal and the third optical signal.

* * * * *